May 30, 1967  M. D. W. ADLER ETAL  3,322,523
DRAWING SHEET GLASS
Filed Sept. 17, 1964

INVENTORS.
Meryle D. W. Adler
Raphael A. Simon
BY
ATTORNEY

3,322,523
DRAWING SHEET GLASS
Meryle D. W. Adler, Painted Post, and Raphael A. Simon, Corning, N.Y., assignors to Corning Glass Works, Corning, N.Y., a corporation of New York
Filed Sept. 17, 1964, Ser. No. 397,160
11 Claims. (Cl. 65—101)

This invention relates to an improved method of drawing sheet glass, and more particularly to a process for continuously producing sheet glass having virgin surfaces which are free of surface marks normally associated with sheet glass and produced during its formation at the interface between a refractory or metal forming means and the molten glass.

In the past, it has been known how to manufacture sheet glass by delivering molten glass from a refractory or metal orifice of predetermined size and shape, or by drawing from a pool of molten glass with metal or refractory walls adjacent to the locus of the draw, however, these methods have not been completely satisfactory due to the formation of detrimental surface marks on the sheet which are oriented parallel to the direction in which the sheet issues from the orifice or pool. The nature of these surface marks is such that they cause light from a remote source which is projected through a sheet of the glass held in front of a screen, to appear as light and dark continuous streaks visible to the unaided eye and running parallel to the direction in which the sheet issued from the orifice or pool. In addition, such surface marks may tend to cause distortion or aberration, thus rendering the sheet completely unsuitable for the intended purposes.

There are, of course, various known continuous processes for finally producing glass sheets without surface marks by mechanically, chemically or thermally finishing the sheet after it is rolled and annealed. However, since the surface marks are originally formed with these known processes of manufacture, they require these additional finishing operations such as grinding and/or polishing steps which not only are time-consuming but also expensive. Basically, the present invention relates to the elimination of surface streak defects normally produced during the formation of sheet glass, by establishing a zone of molten glass from which new glass surface is created, wherein the zone is sufficiently removed from the parting line or interface between the molten glass and its last contacted surface before sheet formation.

It thus has been an object of our invention to provide a method of forming sheet glass having improved surface quality as formed.

A further object of our invention has been to provide an improved method of forming sheet glass free of surface marks which are nomally associated with existing processes for making sheet glass.

A further object of our invention has been to provide a method of forming sheet glass having virgin surfaces by establishing a zone from which new glass surface is created at a location sufficiently removed from the parting line between the glass and its last contacted refractory or metal surface so that irregularities in such parting line are not reproduced in the newly created glass surface.

An additional object of our invention has been to provide a process of obtaining sheet glass of improved quality and form by moving a glass wettable surface to create a zone from which new glass surface emanates wherein the zone is spaced-apart from the parting line between the molten glass and movable surface.

These and other objects of our invention will be more apparent to those skilled in the art from the following disclosure and accompanying drawings in which.

Figure 1:
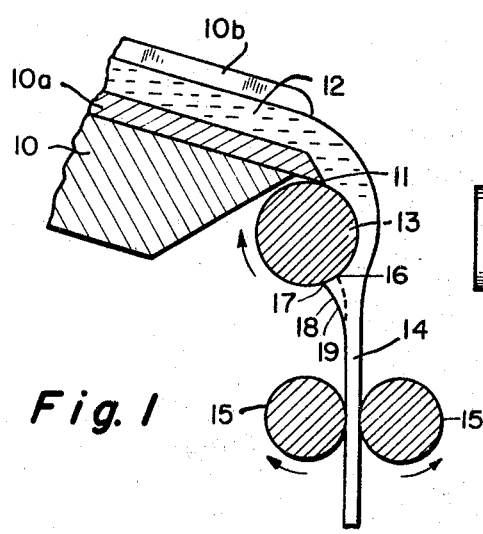
FIGURE 1 is a somewhat schematic side elevational view in section illustrating one embodiment of our invention.
Figure 2:
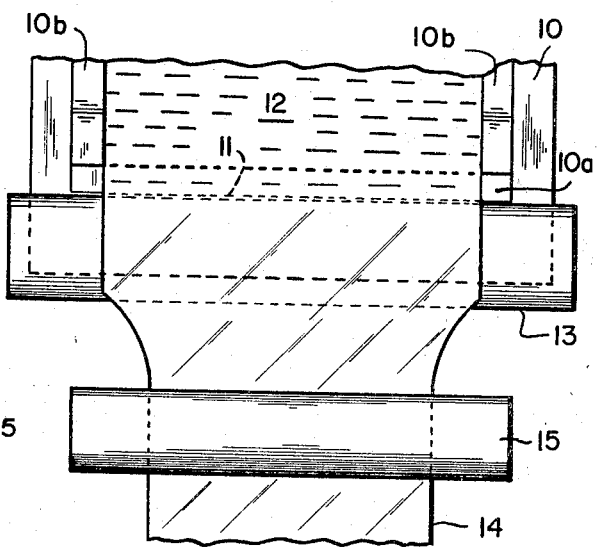
FIGURE 2 is a front elevational view of the apparatus shown in FIGURE 1.

Referring now to the drawings, and particularly FIGURES 1 and 2, a trough 10 having a bottom surface 10a terminating in a delivery lip 11 is shown supplying molten glass 12 from any suitable source such as a tank, over a portion of a rotor 13 positioned immediately beneath the delivery lip 11. The molten glass leaving the rotor, in a manner to be described hereinafter, forms a sheet of glass 14 which may be conveyed by suitable pulling rollers 15. As shown in FIGURE 2, the rotor 13 preferably extends beyond the width of the channel formed by side walls 10b of the delivery trough 10. The rotor may be rotated continuously or intermittently by any suitable known mechanical means, and, as required by the glass being formed, the rotor may be either heated or cooled by conventional roller thermal conditioners.

When sheet glass is drawn from a permanently stationary surface, the molten glass leaves the forming surface along a parting line or glass to forming surface interface shown at 16 in FIGURE 1. Under such condition, a new sheet surface is continuously created at such parting line or line of contact 16 with the forming surface and is carried along the dash line down to the point where the glass is solidified. Accordingly, any irregularities in the parting line, such as those present in the forming surface, are transmitted directly into the sheet since the sheet is formed directly at the parting line, thus producing surface defects such as streak in the formed sheet.

We have discovered, however, that when sheet is drawn from a surface which has been moved in the direction of flow, the parting line or glass to forming surface interface is transposed to a new position such as shown at 17 in FIGURE 1. The interface is transposed in the direction of movement of such surface through a wetting action of the forming surface by the molten glass. By transposting the parting line, a joining zone 18 of quiescent glass is formed immediately adjacent the new parting line 17 from which no surface is created or formed. The joining zone 18 is formed at the contact line and extends only a short distance in the direction of the sheet formation.

We have found, that when the sheet glass forming surface is moved, such as by slowly rotating rotor 13, the movement of the parting line in the direction of rotation has the impact of decoupling the newly formed parting line 17 from a surface formation zone 19, wherein the new glass surface is created. The surface formation zone 19 is adjacent the joining zone 18 and slightly removed from or spaced apart from the parting line 17. Accordingly, since the surface formation zone in effect provides a free surface for the formation of glass sheet, the irregularities in the surface of the forming means, which are present at the parting line, do not affect the formation of the sheet and therefore are not present in its surface.

The rate of rotation of the rotor 13 will vary the distance between the normal parting line which exists at no rotation, and the dynamic parting line produced at a given rate of rotation. If the amount of rotation is greatly increased, the wetting and viscous coupling effects have a tendency to bring a portion of the glass back up toward the feeding area, thus interferring with the incoming flow and creating undesirable surfaces. Therefore, the object of the rotation is to obtain and maintain a slight displacement of the parting line which eliminates streak, rather than creating a complete circular or cylindrical flow about the rotor. It has been found that such displacement may be as small as a quarter of an inch and still obtain effective streak-free results. We have found that surface speeds in the amount of about 1½ inches to 6 inches per hour provide excellent sheet glass having surface quality equivalent to that of a fire polish finish.

It is possible to move the forming surface intermittently so as to displace the parting line from where it would normally be under static conditions, and the new parting line remains in its displacing position producing sheet glass having excellent surface quality for periods of up to an hour or more. At the end of such period it is necessary to again move the forming surface so to maintain the parting line in its displaced position, otherwise the normal wetting gradually brings the parting line back to its original point and the surface quality gradually deteriorates back to the streak condition normally produced in the known types of sheet-glass forming operations.

A small film of glass having a thickness of between about 5 to 30 thousandths of an inch may be carried about the rotor. Since the film does not build up, it is not detrimental to the operation of our invention, however, if desired, it may be removed by any suitable means such as scraping or heating.

Figure 3:
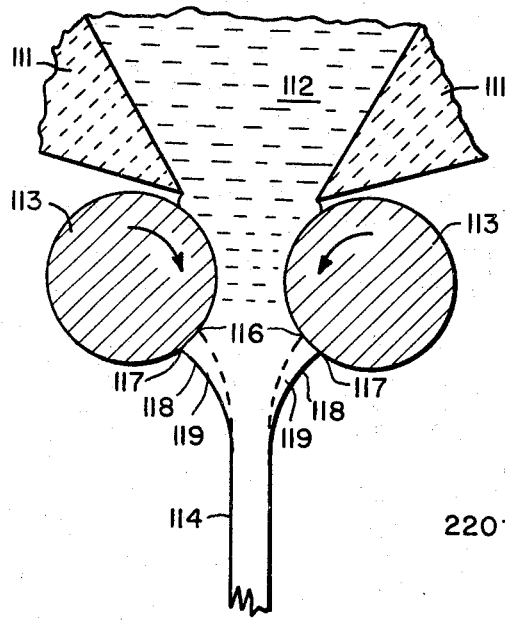
FIGURE 3 is a fragmental side elevational view in section illustrating a further embodiment of our invention.

Referring now to FIGURE 3, a further embodiment of apparatus capable of carrying out our invention is illustrated having a pair of cooperable rotors 113 positioned beneath a refractory or metal orifice 111 which delivers a molten glass 112 to the rotors from a suitable supply thereof such as a melting unit. The rotors 113 are moved in the direction of the arrows so as to transpose the static or stationary parting lines 116 along the movement of the rotor surface to the dynamic or new parting lines 117. As a result, a surface formation zone 119, from which the new glass surface is created, is formed in a decoupled or spaced-apart relationship from the dynamic parting line 117 by means of a joining zone of quiescent glass 118.

Accordingly, the movable double rotors 113 provide sheet glass 114 of improved quality having virgin surfaces on both sides thereof which are free of surface irregularities normally produced in glass sheet at the molten glass-forming surface parting line. Although the single rotor concept also produces sheet having virgin surfaces on both sides, since the upper surface is a free surface, the double rotor concept is preferably utilized for bottom orifice delivery, updraw delivery in which the glass sheet is drawn vertically upward from the zone between the rotors, as would be shown by inverting FIG. 3, and those applications requiring exacting tolerances.

Figure 4:
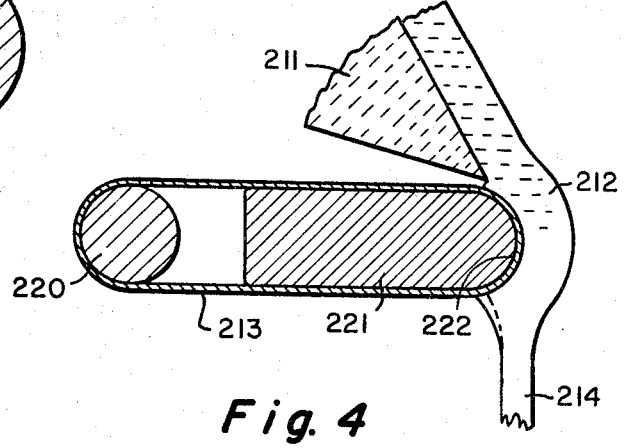
FIGURE 4 is a somewhat schematic side elevational view in section illustrating further means for carrying out the inventive concept of our invention.

FIGURE 4 illustrates a further embodiment of apparatus which may be utilized to perform the novel inventive concept of our invention as illustrated, a movable surface 213 receives molten glass 212 from a suitable feeder or delivery trough 211. The movable surface 213, which may be in the form of a belt or continuous sleeve, is caused to revolve or move in a continuous path by any suitable means such as a roller 220 over a contoured member or shelf 221 having a nose portion 222 of any desired configuration or shape, including that of a rotating drum.

The device of FIGURE 4 functions in the same manner as those shown in FIGURES 1 through 3 to produce sheet glass having excellent surface qualities. The sleeve or belt 213 is moved either continuously or intermittently by the roller 220 to transpose the parting line between the molten glass 212 and the sleeve 213 in the direction of movement. Accordingly, a surface formation zone, from which new glass surface is created, is provided in a spaced-apart or decoupled relationship from the newly formed parting line. As a result, irregularities which may be present in the moveable surface 213 at the parting line are not transferred to the glass surface newly created at the decoupled surface formation zone, so that the resulting sheet 214 is free of surface defects and as provided with virgin surfaces having fire-polished quality.

Although the invention is applicable to a wide range of glasses delivered at the various viscosities and flow rates, the following example is given for purposes of illustration. A glass having a viscosity of about 65 thousand poises at a temperature of about 1150° C. was delivered at a flow rate of about 7 pounds per inch of width to a 5½ inch diameter rotor rotated at a surface speed of 6 inches per hour. A glass sheet having a width of about 1½ feet and a thickness of about .140 inch was produced having excellent surface quality equivalent to that of a fire polish. In contrast, when the rotor was maintained in a stationary position, objectionable surface streak was formed on the glass rendering it completely useless for most intended purposes.

Although we have disclosed the preferred embodiments of our invention, it will be apparent to those skilled in the art that various changes and modifications may be made thereto without departing from the spirit and scope thereof as defined in the appended claims.

We claim:
1. A method of forming sheet glass having virgin surfaces as formed which comprises, flowing molten glass over a movable surface, moving such surface in the direction of flow, to transpose the parting line between the molten glass and such surface in the direction of such movement from a normal stationary position to a new parting line position, maintaining such parting line in a transposed position while continuously removing molten glass from such surface, to form a surface formation zone in the removed molten glass in spaced-apart relationship from the transposed parting line, and drawing new glass surface at such surface formation zone to provide virgin surface sheet glass having fire polished quality.

2. A method of forming virgin surface sheet glass comprising, delivering molten glass to a portion of a continuous movable surface, moving such surface in the direction of the delivery flow to form a dynamic parting line between the molten glass and such surface in spaced-apart relationship from a static parting line which would be formed if the surface were not moved, continuously removing molten glass from such surface while maintaining such a dynamic parting line to provide a surface formation zone in such removed glass in spaced-apart relationship from the dynamic parting line and create new glass surface at the surface formation zone to form sheet glass having fire polished surface quality.

3. An improved method of forming sheet glass of fire polished surface quality as formed which comprises, continuously drawing molten glass over a movable surface, moving such surface to transpose the parting line between the molten glass and such surface from a stationary position to a new position spaced-apart in the direction of such surface movement from the normal stationary position, maintaining the parting line in a transposed position to create a surface formation zone in the glass drawn from such surface which is decoupled from the transposed parting line by a quiescent zone immediately adjacent such parting line, and drawing new glass surface at the surface formation zone to produce virgin surfaced sheet glass of fire polished quality.

4. The method as defined in claim 3 wherein the parting line is maintained in a transposed position by continuously moving the movable surface.

5. The method as defined in claim 3 wherein the parting lines is maintained in its transposed position by periodically moving the movable surface.

6. A method of forming virgin surfaced sheet glass having a fire polished quality as formed which comprises, drawing molten glass over a portion of a continuous surface, moving such surface in the direction of draw to transpose the parting line between the molten glass and such surface in the direction of such movement from a normal parting line position, maintaining the parting line in such transposed position during the drawing operation and thereby form a zone of surface formation in the glass drawn from such continuous surface in spaced-apart relation from the transposed parting line, and forming new glass surface in said zone of surface formation to produce virgin surfaced sheet glass having a fire polished quality.

7. The method as defined in claim 6 wherein the movable surface follows a cylindrical path.

8. The method as defined in claim 6 wherein the movable surface follows an endless sleeve-like path.

9. A method of forming sheet glass having virgin surfaces of fire polished quality comprising, passing molten glass between a pair of cooperable movable surfaces, moving each of such surfaces in the direction of flow of the molten glass to cause the parting line between the molten glass and each of such surfaces to be transposed in the direction of movement of each surface from a normal parting line position, continuously drawing molten glass from such surfaces, maintaining transposed parting lines to create a surface formation zone in the glass drawn from such surfaces at a position spaced-apart from both transposed parting lines, and forming new glass surface from each surface formation zone to provide sheet glass having virgin surfaces of fire polished quality.

10. A method as defined in claim 9 wherein said movable surfaces each rotate about a cylindrical path.

11. A method as defined in claim 9 wherein said movable surfaces each follow an endless sleeve-like path.

References Cited

UNITED STATES PATENTS

| | | | |
|---|---|---|---|
| 2,225,369 | 12/1940 | Danner | 65—101 |
| 2,263,493 | 11/1941 | Habert | 65—253 |

DONALL SYLVESTER, *Primary Examiner.*

G. R. MYERS, *Assistant Examiner.*